(12) United States Patent
Gosling et al.

(10) Patent No.: US 9,194,121 B2
(45) Date of Patent: Nov. 24, 2015

(54) TANGENTIAL NON-DIMENSIONAL INTERFACE MODULE

(75) Inventors: Geoff Gosling, Alberta (CA); Mogens F. Smed, Alberta (CA)

(73) Assignee: DIRTT Environmental Solutions, Ltd., Calgary (CA)

( * ) Notice: Subject to any disclaimer, the term of this patent is extended or adjusted under 35 U.S.C. 154(b) by 0 days.

(21) Appl. No.: 12/980,163

(22) Filed: Dec. 28, 2010

(65) Prior Publication Data

US 2011/0138719 A1 Jun. 16, 2011

Related U.S. Application Data

(63) Continuation-in-part of application No. 12/717,810, filed on Mar. 4, 2010, now abandoned.

(60) Provisional application No. 61/157,529, filed on Mar. 4, 2009.

(51) Int. Cl.
| | |
|---|---|
| *F16C 11/04* | (2006.01) |
| *E04B 2/82* | (2006.01) |
| *E04B 2/74* | (2006.01) |
| *E04B 1/68* | (2006.01) |
| *E04B 1/61* | (2006.01) |

(52) U.S. Cl.
CPC ............... *E04B 2/828* (2013.01); *E04B 1/6813* (2013.01); *E04B 2/7405* (2013.01); *E04B 2001/6195* (2013.01); *Y10T 403/42* (2015.01); *Y10T 403/45* (2015.01)

(58) Field of Classification Search
CPC .................. A47G 5/00; G09F 15/0068; E04B 2002/7483; E04B 2/7405; E04B 2/828; E04G 3/22

USPC ............ 403/65, 70, 119, 205, 231, 265, 266, 403/292, 293, 300; 256/65.02, 65.03; 52/32, 71, 223.11, 223.13, 238.1, 241, 52/272, 281, 282.1, 578, 590.1, 591.4, 52/645, 848; 160/135; 49/489.1, 501, 504; 16/225

See application file for complete search history.

(56) References Cited

U.S. PATENT DOCUMENTS

| | | | | | |
|---|---|---|---|---|---|
| 1,022,137 | A | * | 4/1912 | Hodge | 206/81 |
| 2,910,209 | A | * | 10/1959 | Nelson | 220/378 |
| 3,962,827 | A | * | 6/1976 | Chaffee | 49/384 |
| 4,129,163 | A | * | 12/1978 | Johnson | 160/135 |
| 4,484,832 | A | * | 11/1984 | Weissenberger | 403/191 |
| 4,785,565 | A | * | 11/1988 | Kuffner | 40/605 |
| 5,339,576 | A | * | 8/1994 | Fussler | 52/71 |
| 5,363,616 | A | * | 11/1994 | Hernandez | 52/281 |
| 5,481,839 | A | * | 1/1996 | Lang et al. | 52/235 |
| 5,887,392 | A | * | 3/1999 | Martin | 52/204.5 |

(Continued)

OTHER PUBLICATIONS

European Search Report, EP 11195945, Mailed Sep. 11, 2014.

*Primary Examiner* — Gregory Binda
*Assistant Examiner* — Nahid Amiri
(74) *Attorney, Agent, or Firm* — Workman Nydegger

(57) ABSTRACT

Devices, systems, and components for attaching a modular element to a lateral surface at a variety of different angles include a connector module having a modular element interface on one end and a lateral surface interface on an opposing end. A flexible tip seal is located at the lateral surface interface of the connector module. The flexible tip seal enables an assembler to attach a modular element to a desired lateral structure at a variety of different angles.

22 Claims, 8 Drawing Sheets

(56) References Cited

U.S. PATENT DOCUMENTS

| | | | |
|---|---|---|---|
| 6,041,563 A * | 3/2000 | Vollers | 52/281 |
| 6,202,382 B1 * | 3/2001 | Conterno | 52/762 |
| 6,397,537 B2 * | 6/2002 | Auer et al. | 52/282.2 |
| 6,415,566 B2 * | 7/2002 | Auer | 52/238.1 |
| 6,493,995 B2 * | 12/2002 | McKenzie | 52/36.4 |
| 6,599,055 B2 * | 7/2003 | Auer et al. | 403/381 |
| 6,688,056 B2 | 2/2004 | Von Hoyningen Heune | |
| 6,772,567 B2 * | 8/2004 | Diffrient, Jr. et al. | 52/239 |
| 7,174,691 B2 * | 2/2007 | de Garay Arellano | 52/716.1 |
| 7,328,480 B2 * | 2/2008 | Schoemann | 16/225 |
| 7,891,671 B2 * | 2/2011 | Allford | 277/645 |
| 2008/0066414 A1 * | 3/2008 | Gosling et al. | 52/588.1 |
| 2010/0226709 A1 | 9/2010 | Gosling | |

\* cited by examiner

TANGENTIAL NON-DIMENSIONAL INTERFACE MODULE

CROSS-REFERENCE TO RELATED APPLICATIONS

This application is a continuation-in-part of U.S. patent application Ser. No. 12/717,810 filed on Mar. 4, 2010, now abandoned entitled "TANGENTIAL NON-DIMENSIONAL INTERFACE MODULE," which claims the benefit of priority to U.S. Provisional Patent Application No. 61/157,529, filed on Mar. 4, 2009, also entitled "TANGENTIAL NON-DIMENSIONAL INTERFACE MODULE." The entire content of each of the aforementioned applications is incorporated herein by reference.

BACKGROUND OF THE INVENTION

1. The Field of the Invention

The present disclosure is generally related to modular systems.

2. Background and Relevant Art

Office space can be relatively expensive, not only due to the basic costs of the location and size of the office space, but also due to any construction needed to configure the office space in a particular way. For example, an organization might purchase or rent a large open space in an office complex, and then subdivide or partition the open space into various offices, conference rooms, or cubicles, depending on the organization's needs and size constraints. Rather than having to find new office space and move as an organization's needs change, it is often necessary to have a convenient and efficient means to reconfigure the existing office space. Many organizations address their configuration and reconfiguration issues by dividing large, open office spaces into individual work areas using modular systems.

One advantage of modular systems is that they are relatively easy to set up and can be configured in a number of different ways. Another advantage is that modular systems can be less expensive to set up, and can be, if necessary, reconfigured more easily than more permanently constructed office dividers. For example, a set of offices and a conference area can be carved out of a larger space in a relatively short period of time with the use of a modular system. If needs or desires change, the organization can readily reconfigure the space.

Conventional modular systems are assembled by connecting individual modular elements, like modular wall elements or modular desk elements, together. Modular wall elements can be connected to other modular wall elements in a number of different configurations to divide a space into a desired configuration. For example, modular wall elements can be connected together at their ends to create an elongated modular wall. Modular wall elements can also be connected in non-straight lines to form angles and create corners in a modular system. Conventional modular systems also allow for three or more modular wall elements to intersect at a single point, thereby creating a "T" or "X" configuration in the modular system.

Creating a desired configuration using a conventional modular system can be challenging for several different reasons. First, conventional modular systems do not generally provide much flexibility in terms of attachment locations for intersecting modular wall elements. In some conventional modular systems, an assembler can only place an intersecting modular wall element at a pre-existing intersection between two or more modular wall elements. For example, if an organization wants to divide a large modular office into two smaller modular offices, an assembler may only be able to place the partitioning modular wall element at the connecting points of two modular walls already defining the larger office space. This may present a problem if the organization wants the partition to attach to an existing modular wall element at a point somewhere in between connecting points of individual modular wall elements defining the larger office space. This reduces the number of configuration options that are possible in many conventional modular systems.

In addition, many conventional modular systems require the presence of a post module at the location where the modular wall element intersects. Post modules can contain multiple surfaces that attach to the ends of modular wall elements, thereby allowing for the intersection of multiple modular wall elements at a single point. To the extent that a post module is not present at the desired intersection location, an assembler may need to add one. Depending on the size of the post module, installation of a post module to a pre-existing modular wall could extend the length of the modular wall. This could present spacing problems in large modular systems where extending the length of a modular wall, even by a small amount, could require a reconfiguration of the entire system.

Finally, in some conventional modular systems, the angles at which modular wall elements connect tend to be fixed, and not variable. In some conventional modular systems, very few angular configurations for connecting two walls are possible. For example, in some conventional modular systems, two walls may be joinable only at 180 degree angles (or in a straight line), 90 degree angles, 45 degree angles, or 30 degree angles. With these systems, it is difficult to partition a space into offices or cubicles that require angular configurations other than those for which hardware is specifically provided.

Accordingly, there are a number of disadvantages in conventional modular systems that can be addressed.

BRIEF SUMMARY OF THE INVENTION

In general, implementations of the present invention include devices, systems, and components for attaching walls in modular building systems. In particular, implementations of the present invention comprise a connector module having one or more components and interfaces that enable an assembler to attach a modular element to a desired lateral structure at a variety of different angles. Accordingly, embodiments of the present invention can overcome disadvantages in conventional modular systems.

In one example embodiment, a connector component for use in modular wall systems can be configured to allow one or more modular walls to connect to one or more lateral structures at a variety of different angles. The connector component can include a connector module that has a lateral structure interface end and an opposing modular element interface end, and a tip seal that can be configured to flexibly attach to the lateral structure at multiple different angles. The lateral structure interface end can be shaped to attach via the tip seal to a lateral structure at a plurality of different angles, and the opposing modular element interface is configured for attachment to one or more modular elements.

In another exemplary embodiment, a connector module for use in modular wall systems can be configured to pivotally connect modular elements to lateral structures. The connector module can include a body that has a first end and a second end, wherein the first and second ends are located on opposing ends of the body, and the body is more narrow at the second end than at the first end. A modular element interface can be located at the first end of the body and be further configured to secure the body to a modular element. A recess can be located at the narrow second end of the body, the recess can further be shaped to receive a flexible tip seal that can have one or more flanges that insert into the recess to secure the flexible tip seal to the body. The flexible tip seal can also be configured to attach the body to a lateral structure at a variety of different angles.

In yet another exemplary embodiment, a modular wall system can be configured for variably connecting a plurality of adjacent wall modules with a consistent seal against light and sound and at a plurality of different angles. The system can include a lateral structure, a modular element, and a connector component that can have a modular element interface at one end that is configured to attach to the modular element and a lateral structure interface end at an opposing end that is configured to attach to the lateral structure. The connector component can be more narrow at the lateral structure interface than it is at the modular element interface and the lateral structure interface can further include a tip seal that can be flexible and deform to create an attachment with the lateral structure.

Additional features and advantages of exemplary embodiments of the invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

In general, implementations of the present invention include devices, systems, and components for attaching walls in modular building systems. In particular, implementations of the present invention comprise a connector module having one or more components and interfaces that enable an assembler to attach a modular element to a desired lateral structure at a variety of different angles. Accordingly, embodiments of the present invention can overcome disadvantages in conventional modular systems.

In one example embodiment, a connector component for use in modular wall systems can be configured to allow one or more modular walls to connect to one or more lateral structures at a variety of different angles. The connector component can include a connector module that has a lateral structure interface end and an opposing modular element interface end, and a tip seal that can be configured to flexibly attach to the lateral structure at multiple different angles. The lateral structure interface end can be shaped to attach via the tip seal to a lateral structure at a plurality of different angles, and the opposing modular element interface is configured for attachment to one or more modular elements.

As will be understood from the following description and claims, one aspect of the present invention relates to a connector module that attaches a modular element to a number of different lateral structures without the need for a modular post or additional modular hardware that may create a disruption to a modular system. In accordance with the present invention, a lateral structure could include, for example, a modular element, such as a modular wall element, an intersection between two or more modular wall elements, or a modular receiving post. A lateral structure could also include a non-modular element, such as a cement, glass, brick, dry-wall or wood.

Another aspect of the present invention that will be understood from the description and claims relates to a connector module that attaches a modular element to a lateral structure at number of different angles. An assembler of a modular system can use a connector module according to the present invention to achieve a desired angle between a lateral structure and a modular element. One will appreciate that additional advantages of the present invention exist and will be apparent from the following description and claims.

Figure 1A:
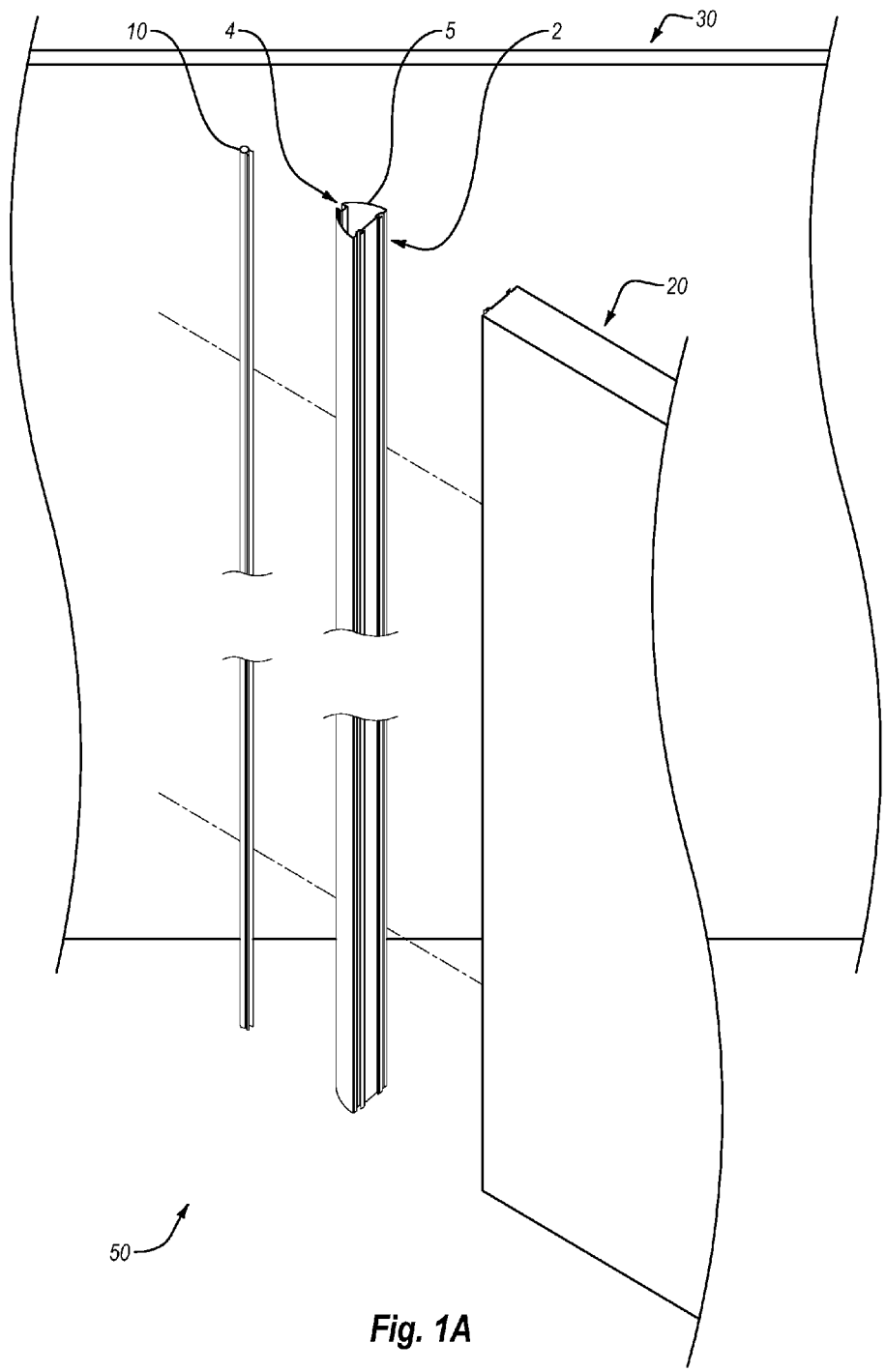
FIG. 1A illustrates an exploded view of an exemplary connector module in accordance with one implementation of the present invention.

For example, FIG. 1A illustrates an exploded view of a modular system in accordance with at least one implementation of the present invention. In particular, FIG. 1A shows a connector module 5 having an elongated body with a modular element interface 2 on one end, and a lateral structure interface 4 on an opposing end. Connector module 5 can be constructed from any naturally occurring or synthetic material, including but not limited to metal, plastic, rubber, or composites thereof, or any other suitable material. The modular element interface 2 in FIG. 1A attaches connector module 5 to a modular element 20 (e.g. a modular wall) and can include hooks, slots, or any other interlocking or securing mechanism that is capable of attaching connector module 5 to a modular element 20.

FIG. 1A also shows that the lateral structure interface 4 can be configured so that a tip seal 10 can be secured thereto. While the embodiment illustrated in FIG. 1A shows the tip seal 10 and connector module 5 as separate components, one will appreciate that in alternative embodiments of the present invention, the tip seal 10 can be an integral part of connector module 5. Specifically, the tip seal 10 and connector module 5 can be formed (e.g. molded or extruded) together as a unitary component.

One will also appreciate that the tip seal 10 at the lateral structure interface end 4 of connector module 5 can be constructed from any flexible material including rubber or plastic or composites thereof. Alternatively, tip seal 10 could be made from a natural material, such as wood. With regard to implementations of the present invention that include a tip seal 10 made from a flexible material, the flexible properties allow tip seal 10 to distort when it is pressed against a lateral structure 30. This distortion of tip seal 10 assists in attaching connector module 5, and any modular element connected thereto, to lateral structure 30.

There are various ways in which the distortion of tip seal 10 can assist in creating an attachment to a lateral structure. For example, tip seal 10 can be pressed against a generally flat lateral structure to create a purely frictional attachment. In an alternative embodiment, tip seal 10 can be pressed into an appropriately shaped space or groove to create a more secure attachment (e.g. FIGS. 3B and 4B).

The length of connector module 5 is variable. Connector module 5 can run the entire length of lateral structure 30 or modular element 20. However, a connector module of the present invention can attach a modular element 20 to a lateral structure 30 without extending the entire length of either the modular element or the lateral structure to which an attachment is desired. For example, one will appreciate that a connector module in accordance with the present invention could attach a modular element to a lateral structure along a portion (or portions) of the modular element, or a portion (or portions) of the lateral structure.

One will also appreciate that an additional advantage of a connector module 5 that extends the entire length of lateral structure 30 or modular element 20 is that it can provide can better insulation from sound and light that may be present in adjacent spaces. One will further appreciate that the flexible nature of the tip seal can enable the connected walls to reduce the light and sound that is allowed to pass between modular spaces, particularly as the walls are pressed closer together at the connection point.

Figure 1B:
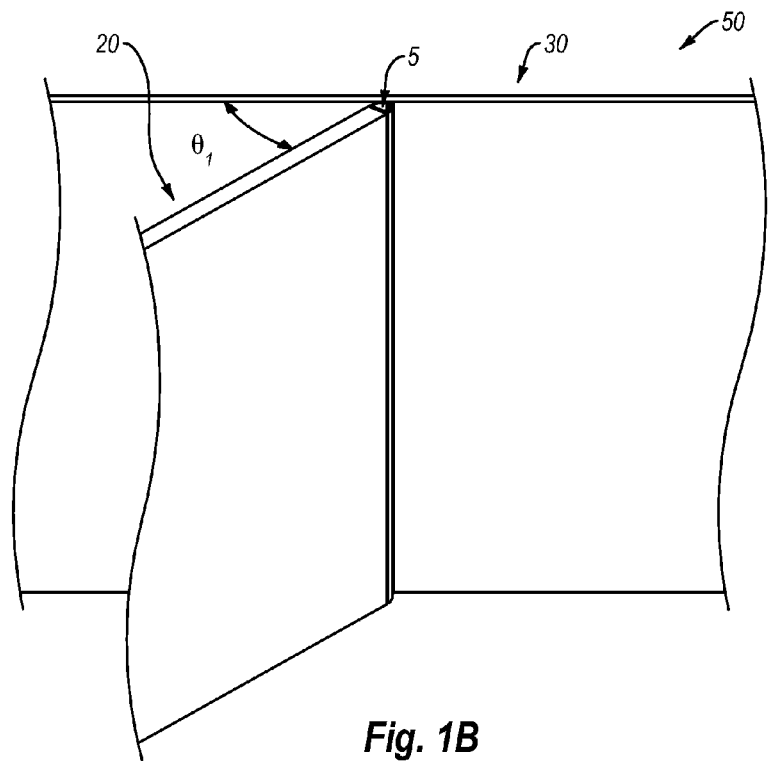
FIG. 1B illustrates a perspective view of an exemplary connector module when used to attach a modular wall element to a vertical surface at a first angle in accordance with one implementation of the present invention.

The flexible properties of tip seal 10 also allow connector module 5, and any modular element connected thereto, to be attached to a lateral structure 30 at a variety of different angles. For example, FIG. 1B illustrates a perspective view of a modular system in accordance with one implementation of the present invention. FIG. 1B shows modular system 50, in which connector module 5 is attached to lateral structure 30 and modular element 20. In the embodiment illustrated in FIG. 1B, connector module 5 extends the entire length of modular element 20 and lateral structure 30. As can be seen in FIG. 1B, connector module 5 intersects lateral structure 30 creating an angle of $\theta_1$ between modular element 20 and lateral structure 30.

Figure 1C:
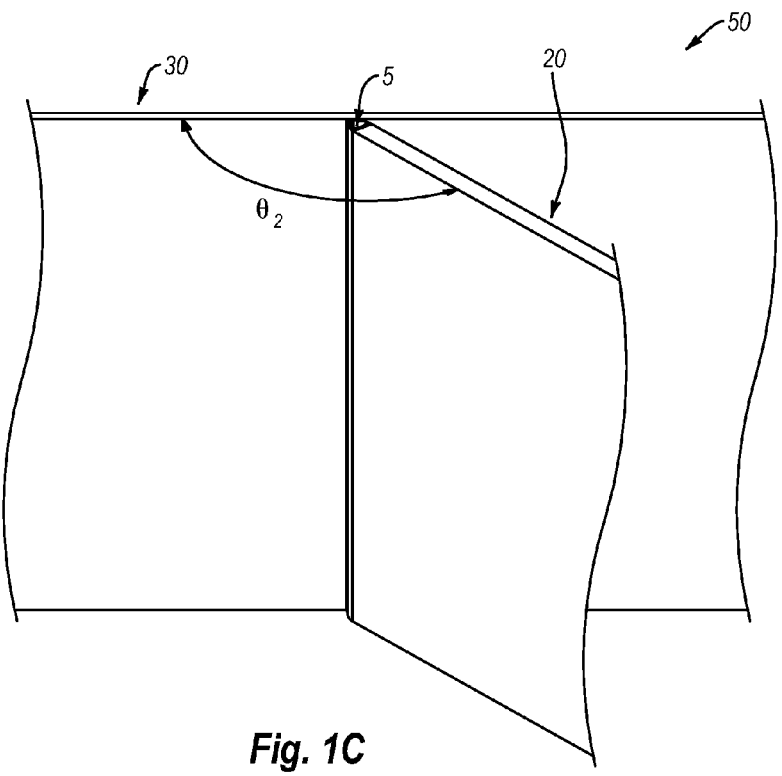
FIG. 1C illustrates another perspective view of an exemplary connector module when used to attach a modular wall element to a vertical surface at a second angle in accordance with one implementation of the present invention.

FIG. 1C illustrates an additional perspective view of modular system 50. Like FIG. 1B, connector module 5 in FIG. 1C is attached to modular element 20 at one end and is attached to lateral structure 30 at another end. Connector module 5 also extends the entire length of modular element 20 and lateral structure 30. Unlike FIG. 1B, however, connector module 5 in FIG. 1C intersects lateral structure 30 creating a different angle of $\theta_2$ between modular element 20 and lateral structure 30. While FIGS. 1B and 1C illustrate exemplary embodiments of the present invention creating angles of intersection of $\theta_1$ and $\theta_2$, one will understand that implementations of the present invention will allow for many different configurations and angles of intersection.

In addition, a manufacturer of connector module 5 will appreciate that a connector module of the present invention can take on a number of different shapes that would avoid interference at differing angles of intersection. For example, in one embodiment connector module 5 could be more narrow at the lateral structure interface end and more broad at the modular element interface end. As will be discussed in more detail hereafter, the illustrated shape can allow the connector module and any modular element attached thereto to pivot about the narrow end of the connector module without interfering with the surface to which they are attached.

Figure 2A:
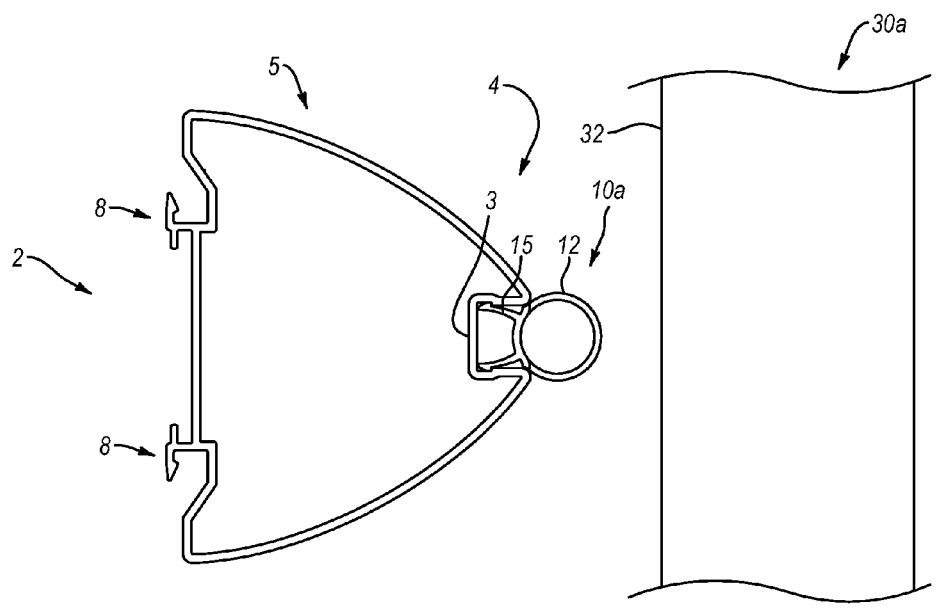
FIG. 2A illustrates a top plan view of an exemplary embodiment of a connector module before attachment to an adjacent wall in accordance with the present invention.

FIG. 2A illustrates a top plan view of an additional exemplary connector module in accordance with the present invention. In the embodiment shown in FIG. 2A, connector module 5 has a modular element interface 2 on one end, and a lateral structure interface 4 on an opposing end. In the embodiment shown in FIG. 2A, two hooks 8, are located at the modular element interface 2. The modular element with which the hooks 8 can interface includes, but is not necessarily limited to, modular wall elements (e.g. at the edge of wall 20 in FIG. 1A).

FIG. 2A also shows that a recess 3 can be located at the lateral structure interface 4. Recess 3 in FIG. 2A is configured to receive a tip seal 10a. FIG. 2A illustrates a tip seal 10a that has two opposing flanges 15 that fit within recess 3 to secure tip seal 10a to connector module 5. One will appreciate that there are numerous ways in which to secure a tip seal to the lateral structure interface of a connector module in accordance with the present invention. In addition, as mentioned previously, a connector module in accordance with the present invention can include a tip seal that is not separate from the connector module, but constructed as a singular unit.

The tip seal 10a shown in FIG. 2A also has a generally circular flexible portion 12 that extends outside of recess 3. One will appreciate, however, that a tip seal in accordance with the present invention can take on many different shapes. In particular, the generally flexible portion 12 shown in FIG. 2A can distort to allow the connector module to attach to a wide variety of lateral structures. For example, FIG. 2A illustrates a generally flat lateral structure 30a. Using this embodiment of the present invention, an assembler of a modular system could frictionally attach a connector module to a lateral structure by pressing the flexible circular tip seal 10a against the generally flat vertical surface.

Figure 2B:
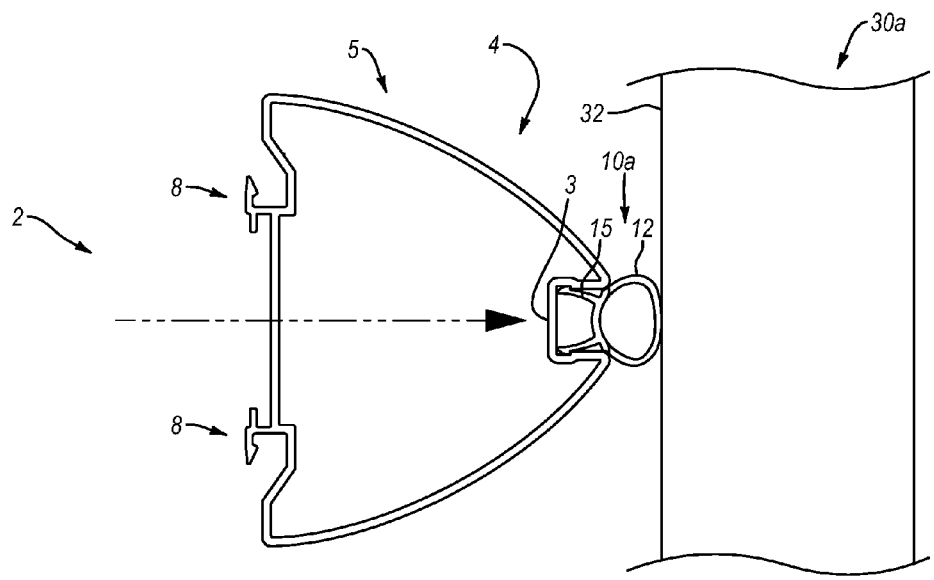
FIG. 2B illustrates a top plan view of the example connector module shown in FIG. 2A after attachment to the wall.

FIG. 2B illustrates such an attachment. The flexible properties of tip seal 10a in the embodiment shown in FIG. 2B allow tip seal 10a to deform and take a shape that allows tip seal 10a to make contact with the surface 32 of lateral structure 30a along at least a portion of surface 32. This deformation in tip seal 10a and its contact with surface 32 creates a frictional attachment between connector module 5 and lateral structure 30a in the exemplary embodiment shown in FIG. 2B. This depression also helps to create a sound and light barrier at the intersection.

One will appreciate that by using the exemplary embodiment shown in FIG. 2B, an intersecting modular element could be added to (or eliminated from) a modular system without disrupting the modular elements already present in the system. This exemplary configuration of the present invention would also allow the intersection of three or more modular elements without the need for an intervening post or other modular hardware.

Figure 2C:
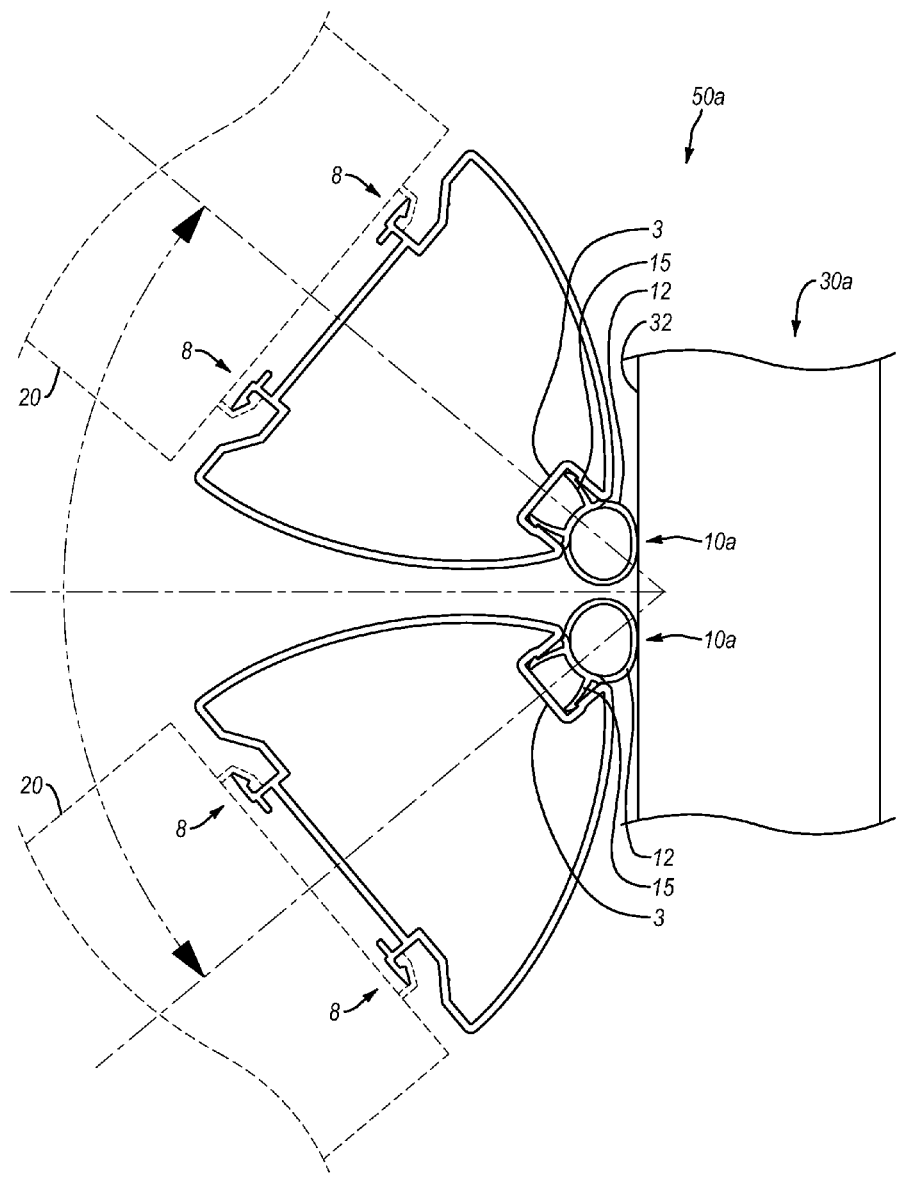
FIG. 2C illustrates a top plan view of the example connector module shown in FIG. 2A when attached to the wall at different angles.

In addition, one will appreciate that the flexible properties of tip seal 10a also allow connector module 5 to attach to lateral structure 30a at multiple different angles. For example, FIG. 2C shows a modular system 50a in which connector module 5 is attached to lateral structure 30a at two different angles. As can be seen in FIG. 2C, the generally circular flexible portion 12 of tip seal 10a deforms in different ways to interface with vertical surface 32 of lateral structure 30a, depending on the angle at which an assembler chooses to attach connector module 5 to lateral structure 30a.

In addition to the flexible properties of tip seal 10a, the shape of connector module 5 can also allow connector module 5 to attach to lateral structure 30a at multiple different angles. For example, connector module 5 shown in FIG. 2C is more narrow at the end where the tip seal 10a is located than it is at the end where the modular element interface 2 is located. As can be seen in FIG. 2C, this shape allows connector module 5 to attach to lateral structure 30a at different angles without interfering with lateral structure 30a. The shape of connector module 5 in FIG. 2C is exemplary. A connector module of the present invention could take on any number of different shapes, so long as the connector module can be attached to a lateral structure at various angles without interfering with the lateral structure to which it is attached.

While the lateral structure 30a illustrated in FIGS. 2A-2C is generally flat in a horizontal direction, it could be curved in a horizontal direction. Indeed, another advantage of the present invention is that it can provide modular options in curved environments. For example, in one exemplary embodiment of the present invention, the lateral structure could be a circular pillar or a curved wall or another curved surface.

Figure 3A:
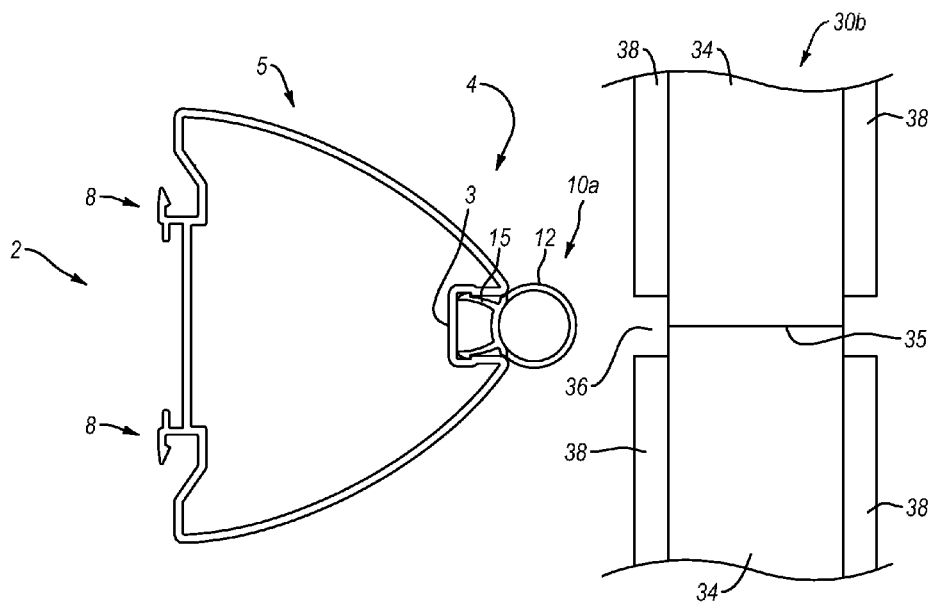
FIG. 3A illustrates a top plan view of an exemplary embodiment of a connector module before attachment to an intersection between two modular elements in accordance with the present invention.

FIG. 3A illustrates a top plan view of another advantage provided by connector module 5 in accordance with the present invention. FIG. 3A illustrates a lateral structure 30b, which comprises an intersection 35 between two modular elements 34. In this case, modular elements 34 have exterior panels 38. As illustrated in FIG. 3A, at the intersection 35 of modular elements 34 a space 36 is created between exterior panels 38. Using this embodiment of the present invention, an assembler of a modular system could attach connector module 5 to lateral structure 30b by pressing the flexible circular tip 12 of tip seal 10a to fit, at least partially, within space 36.

Figure 3B:
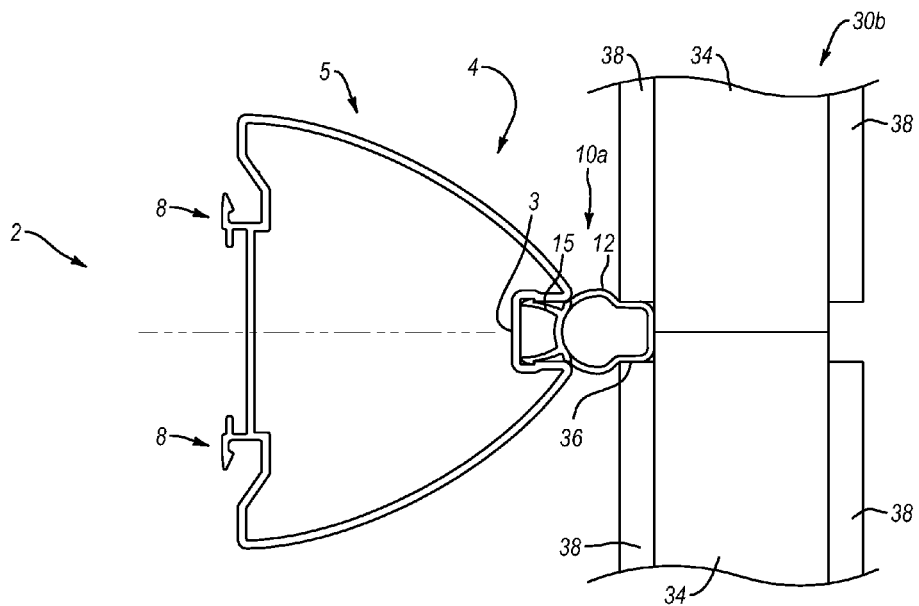
FIG. 3B illustrates a top plan view of the example connector module shown in FIG. 3A after attachment to the intersection between two modular elements.

FIG. 3B shows connector module 5 that has been attached to lateral structure 30b. As can be seen in FIG. 3B, the generally circular flexible portion 12 of tip seal 10a deforms to fit partially within space 36. This creates another, potentially more secure, attachment between connector module 5 and lateral structure 30b. One will appreciate that this embodiment allows an assembler of a modular system to add a partitioning modular element to an intersection between modular elements without the need for an intervening modular post or any additional modular hardware at the intersection.

Figure 3C:
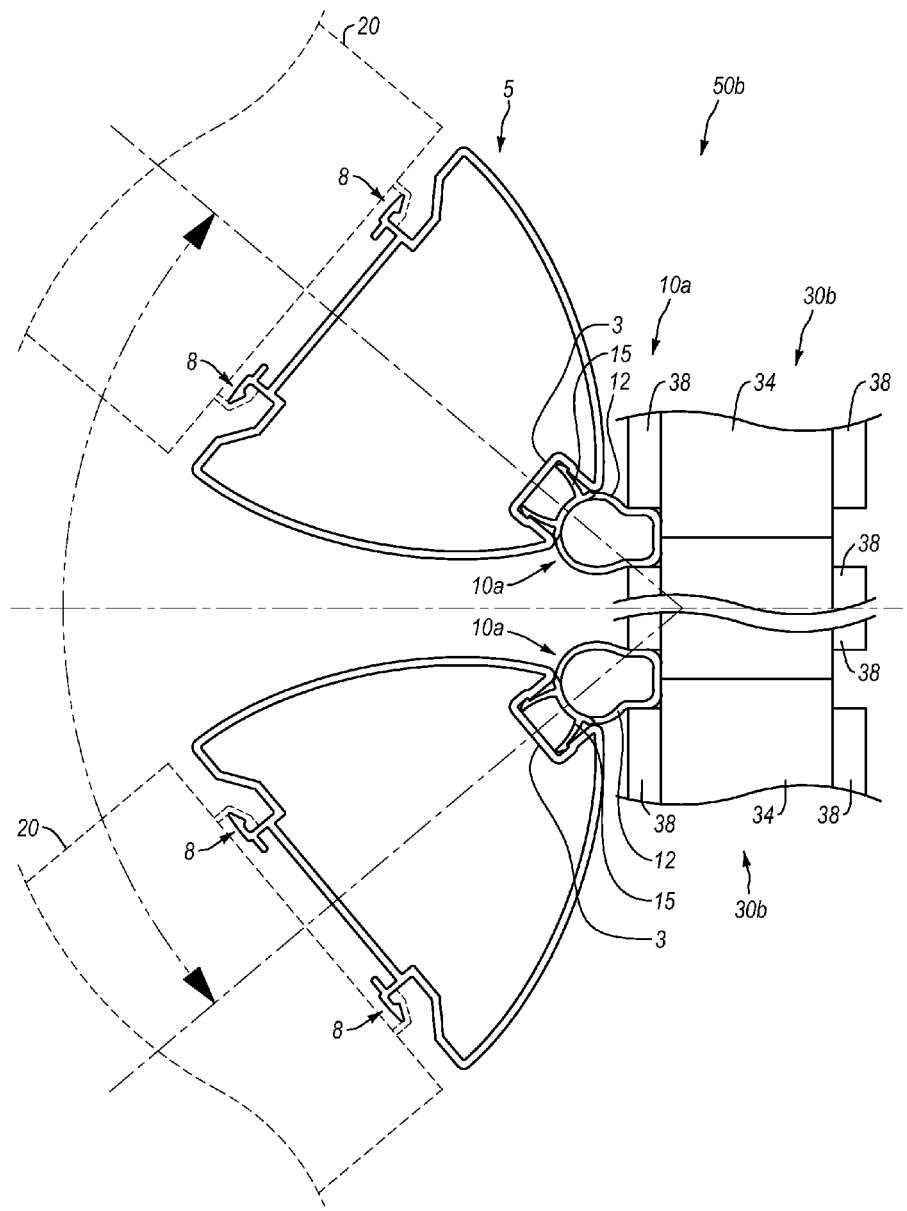
FIG. 3C illustrates a top plan view of the example connector module shown in FIG. 3A when attached to the wall at different angles.

One will also appreciate that the flexible properties of tip seal 10a also allow connector module 5 to attach to lateral structure 30b at multiple different angles. For example, FIG. 3C shows a modular system 50b in which connector module 5 is attached to lateral structure 30b at different angles. As previously discussed, FIG. 3C shows that the generally circular flexible portion 12 of tip seal 10a deforms in different ways, depending on the angle at which an assembler attaches connector module 5 to lateral structure 30b.

While the tip seal 10a illustrated in FIGS. 2A-C and 3A-C has a generally circular flexible portion 12, one will also appreciate that a tip seal according to the present invention could have any number of different shapes, depending on the lateral structure with which a connection is desired. For example, in another exemplary embodiment of the present invention, the tip seal could be elongated and configured to fit within a receiving module.

Figure 4A:
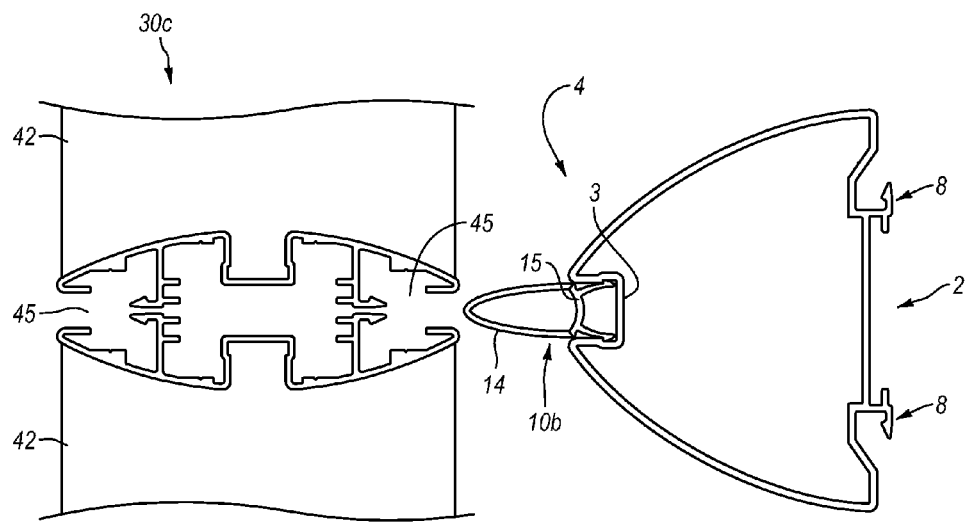
FIG. 4A illustrates a top plan view of another exemplary embodiment of a connector module in accordance with the present invention, albeit one having an elongate tip seal, before attachment to a modular receptacle.

For example, FIG. 4A illustrates a top view of a connector module 5 in accordance with the present invention. As before, FIG. 4A shows that connector module 5 has a modular element interface 2 at one end and a lateral structure interface 4 at an opposite end. Similarly, connector module 5 comprises at the lateral structure interface 4. and two hooks 8 at the modular element interface 2. Recess 3 is configured to receive a tip seal 10b. As with tip seal 10a, tip seal 10b has opposing flanges 15 that secure tip seal 10b within recess 3. Tip seal 10b also has an elongated flexible tip 14 that extends outside of recess 3.

FIG. 4A also shows a lateral structure 30c. In the embodiment shown in FIG. 4A, lateral structure 30c further comprises a modular receiving post which can be placed between and connect two modular wall elements together in a line. The receiving module that is lateral structure 30c in FIG. 4A can be constructed from any naturally occurring or synthetic material including but not limited to metal, plastic, rubber, or composites thereof, or any other suitable material. FIG. 4A shows that lateral structure 30c also has two connector module interfaces 45, into which can be spaces into which the elongated flexible tip 14 of tip seal 10b can be secured. Using this embodiment of the present invention, an assembler of a modular system can attach connector module 5 directly into lateral structure 30c by pressing the elongated flexible tip 14 of tip seal 10a to fit, at least partially, within a connector module interface 45.

Figure 4B:
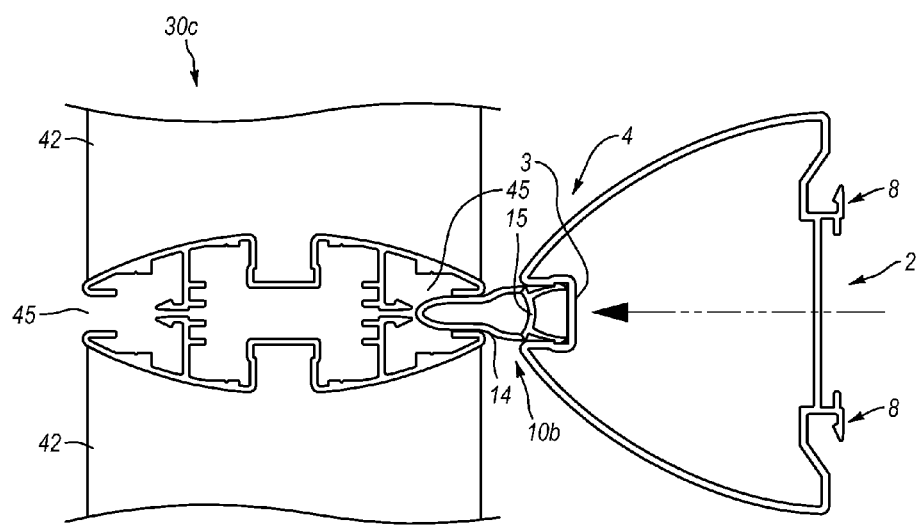
FIG. 4B illustrates a top plan view of the example connector module shown in FIG. 4A after attachment to the modular receptacle shown in FIG. 4A.

FIG. 4B shows connector module 5 that has been attached to lateral structure 30c. In this embodiment, the elongated flexible tip 14 of tip seal 10b is deformed to fit within connector module interface 45 of lateral structure 30c, thereby creating an attachment between connector module 5 and lateral structure 30c.

Figure 4C:
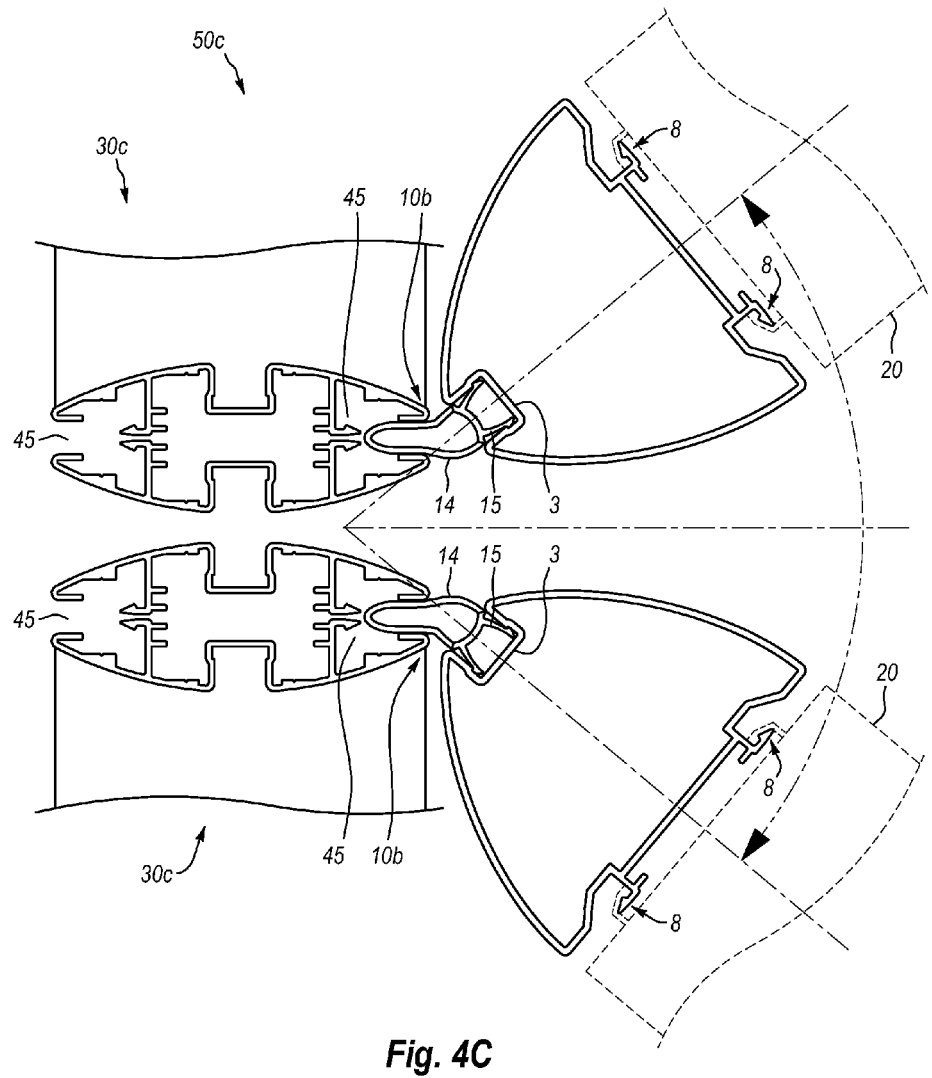
FIG. 4C illustrates a top plan view of the example connector module shown in FIG. 4A when attached to the modular receptacle at different angles.
Figure 2C:
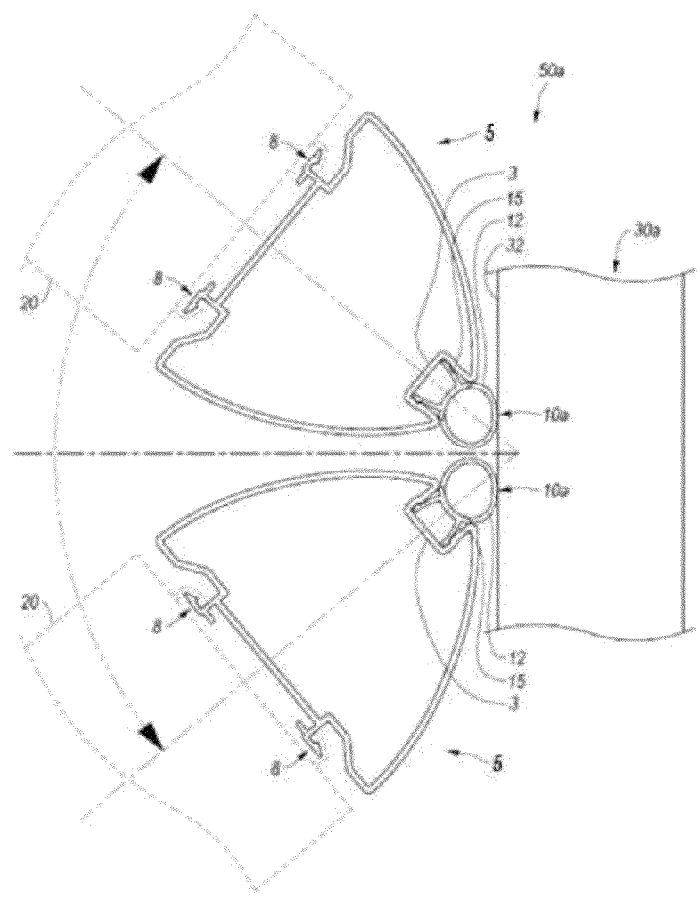
Figure 4A:
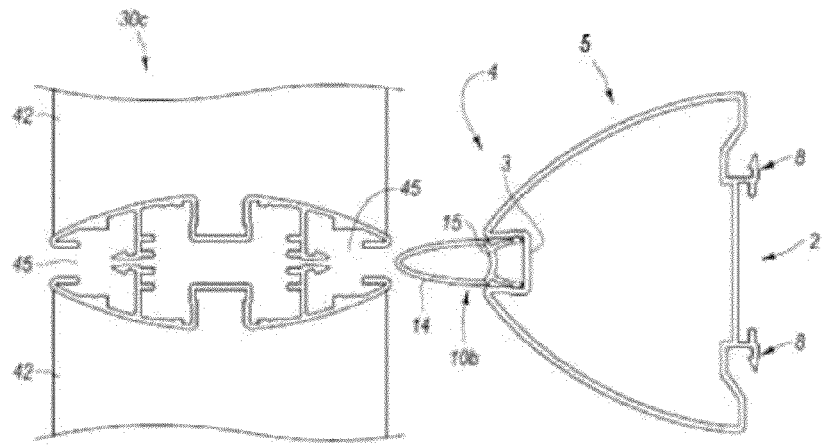
Figure 4B:
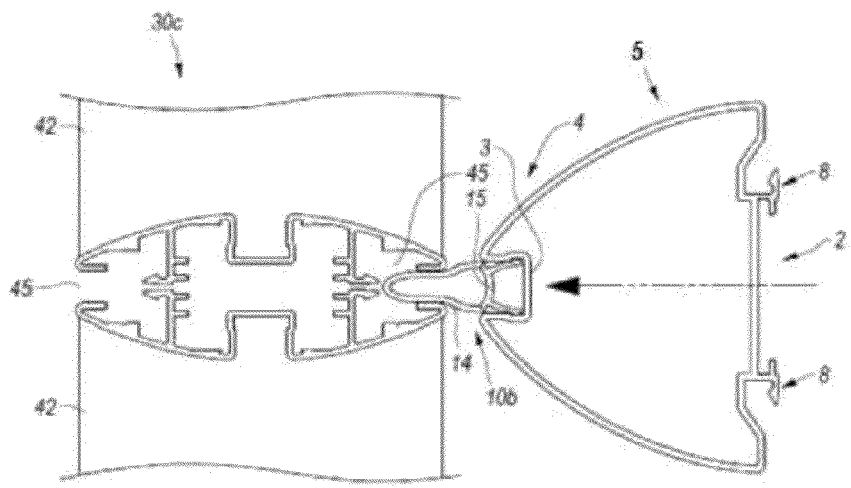
Figure 4C:
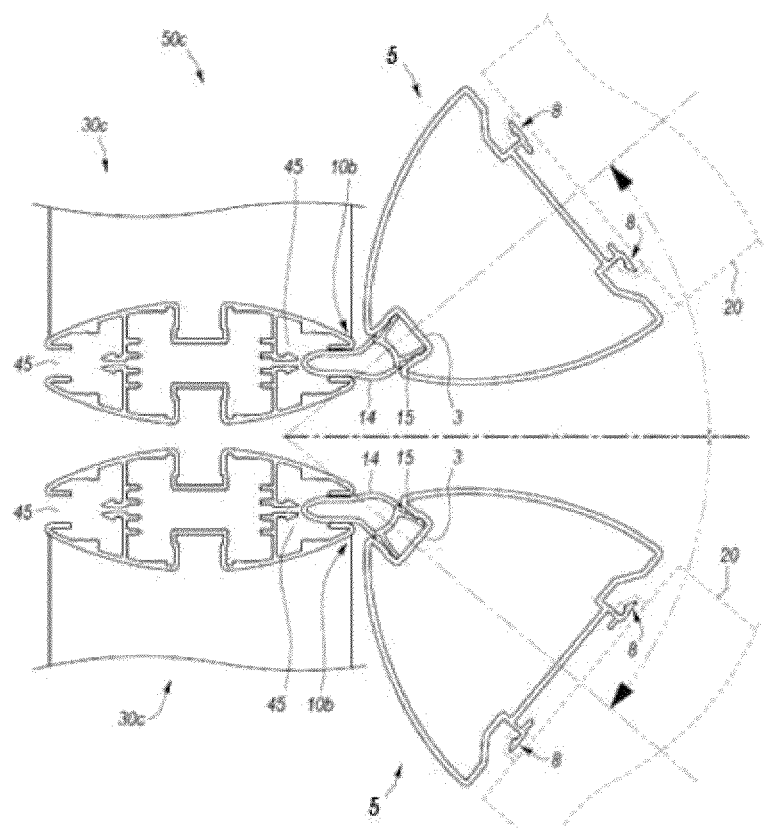

One will appreciate that the flexible properties of tip seal 10b also allow connector module 5 to attach to lateral structure 30c at multiple different angles. For example, FIG. 4C shows a modular system 50c in which connector module 5 is attached to lateral structure 30c at different angles. As can be seen in FIG. 4C, the elongated flexible tip 14 of tip seal 10b deforms in different ways, depending on the angle at which an assembler attaches connector module 5 to lateral structure 30c.

One will appreciate that the configurations illustrated in the Figures are exemplary and are not the only possible embodiments of the present invention. For example, in addition to the shapes illustrated herein, a manufacturer of the present invention could make a connector module having any number of different shapes. For example, the connector module could be circular or oval.

In addition, a manufacturer of the present invention could make a tip seal having a number of shapes. Indeed, depending on the lateral structure with which a attachment is desired, a tip seal could be shaped to interface with a wide variety of different surfaces and structures. For example, a triangular-shaped tip seal could be made to interface with a triangular-shaped space in a particular lateral structure.

As stated previously, the connector module and the tip seal can be formed together as a unitary component, or can be separate components. To the extent that the tip seal and the connector module are not unitary components, there are numerous ways in which a tip seal can be secured to a connector module. For example, the tip seal can have one or more flanges that interface with a space or groove on the connector module. The tip seal can also be secured to the connector module via magnets, Velcro, glue or another material with adhesive properties. The tip seal can be secured to the connector module along the entire length of the tip seal, or can be secured via points of attachment intermittently spaced along the length of the tip seal.

The modular element to which an opposing side of the connector module is attached can be a modular wall element. The modular element could also be a modular desk, a modular shelving unit, or another modular partitioning member.

Finally, an assembler could use the present invention in constructing a modular system. Such a construction could include the steps of securing a connector module of the present invention to a modular element at one end; choosing a lateral structure to which an attachment of the modular element is desired; and pressing the connector module against the lateral structure at a desired angle to create an attachment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A system comprising the following:
    a modular wall;
    a lateral structure; and
    a connector component employing a flexible material for connecting the modular wall to the lateral structure, the lateral structure including a first end and a second end, the connector component connecting the modular wall to a space or groove that is positioned between the first end and the second end of the lateral structure, allowing the modular wall to be rotated at the space or groove relative to the lateral structure, comprising:
        connector module having a lateral structure interface end having a recess, and an opposing modular element interface end connected to a removable modular element; and
        a tip seal positioned at the lateral structure interface end of the connector module within the recess so that a plurality of flanges extending from the tip seal hold the tip seal within the same recess of the connector module, the tip seal having a hollow portion that extends outwardly and away from the connector module, and that deforms and expands within the space or groove of the lateral structure, thereby flexibly attaching the modular element to intersect the lateral interface at the space or groove that is positioned between the first end and the second end of the lateral structure.

2. The system as recited in claim 1, wherein the connector module is narrower at the lateral structure interface end than the modular element interface end.

3. The system as recited in claim 1, wherein the modular element interface comprises:
    a first hook; and
    a second hook,
    wherein the first hook extends away from the second hook and the second hook extends away from the first hook.

4. The system as recited in claim 1, wherein the lateral structure interface end is shaped to attach via the tip seal to a lateral structure at any of a plurality of different angles, and the opposing modular element interface is configured for attachment to one or more modular elements.

5. The system as recited in claim 1, wherein the tip seal remains in the deformed position and is held within the space or groove in the lateral structure before and after rotation of the modular wall component at a plurality of angles up to 90 degrees from the original position of the modular wall.

6. The system as recited in claim 1, wherein the first shape comprises a circular shape.

7. The system as recited in claim 1, wherein the first shape comprises a rounded shape.

8. The system as recited in claim 1, wherein the second shape comprises planar sides.

9. A connector module that pivotally connects modular elements to lateral structures, comprising:
    a body that has a first end and a second end, wherein the first and second ends are located on opposing ends of the body, the body being more narrow at the second end than at the first end;
    a modular element interface located at the first end of the body, the modular element interface being configured to secure the body to a modular element;
    a recess located at the narrow second end of the body; and
    a flexible tip seal, the flexible tip seal having a plurality of flanges that extend toward the body on the first side, the plurality of flanges being configured to depress and insert into the recess to secure the flexible tip seal to the body;
    wherein:
        the flexible tip seal has a first shape, and wherein a lateral structure includes a first end and a second end, the connector module connecting the modular element to a space or groove that is positioned between the first end and the second end of the lateral structure, the space or groove therein formed by a space between opposed exterior panels, the space or groove having a second shape that is non-reciprocal with the first shape;
        the flexible tip seal is configured to deform to fit within the space or groove between the opposed exterior panels of the lateral structure, and to remain deformed and held within the space or groove so that the modular element is connected to and intersects with the lateral structure of a variety of different angles, including during rotation of the modular body relative to the lateral structure.

10. The connector module as recited in claim 9, wherein the modular element interface comprises two hooks pointing in opposing directions.

11. The connector module as recited in claim 9, wherein the space or groove on the lateral structure comprises a gap where two modular walls are joined.

12. The connector module as recited in claim 9, wherein the first shape comprises a circular shape.

13. The connector module as recited in claim 9, wherein the first shape comprises a rounded shape.

14. The connector module as recited in claim 9, wherein the second shape comprises planar sides.

15. A modular wall system having a connector module shaped and configured for variably connecting a plurality of adjacent wall modules at a plurality of different angles, comprising:
 a lateral structure including a first end and a second end, the connector module connecting a plurality of modular elements to a space or groove that is positioned between the first end and the second end of the lateral structure;
 the connector module having a modular element interface at one end that is attached to the modular element, the connector module also having a lateral structure interface end at an opposing end; and
 a tip seal extending from and removably coupled to the lateral structure interface end of the connector module, the tip seal further comprising a flexible material having a round-shaped end, the tip seal being deformed and attached within the space or groove that is positioned between the first end and the second end of the lateral structure formed by opposing exterior panels of the lateral structure, such that the modular element can intersect with the lateral structure at a variety of angles without detachment of the tip seal from the space or groove between the exterior panels;

wherein:
 the connector module is narrower at the lateral structure interface than at the modular element interface thereby enabling the connector module to connect the modular element to the lateral structure at a variety of angles.

16. The modular wall system as recited in claim 15, wherein the modular element is a wall.

17. The modular wall system as recited in claim 15, wherein the tip seal enables the modular connector to remain connected and held within the space or groove while the modular connector is repositioned at any angle up to 90 degrees from its first position relative to the lateral structure.

18. The modular wall system as recited in claim 15, wherein the lateral structure is a modular wall.

19. The modular wall system as recited in claim 15, wherein the modular element interface comprises two hooks coupled to the modular element.

20. The modular wall system as recited in claim 15, wherein the lateral structure comprises an intersection between two or more modular elements, such that the space or groove is formed therebetween for receiving, at least partially, the tip seal to create an attachment.

21. The modular wall system as recited in claim 15, wherein the first shape comprises a circular shape.

22. The modular wall system as recited in claim 15, wherein the second shape comprises planar sides.

* * * * *

UNITED STATES PATENT AND TRADEMARK OFFICE
CERTIFICATE OF CORRECTION

PATENT NO. : 9,194,121 B2
APPLICATION NO. : 12/980163
DATED : November 24, 2015
INVENTOR(S) : Gosling et al.

Page 1 of 4

It is certified that error appears in the above-identified patent and that said Letters Patent is hereby corrected as shown below:

In the Drawings

Fig. 2C, add labeling for connecting level 5 (See Attached Sheet)
Fig. 4A, add labeling for connecting level 5 (See Attached Sheet)
Fig. 4B, add labeling for connecting level 5 (See Attached Sheet)
Fig. 4C, add labeling for connecting level 5 (See Attached Sheet)

In the Specification

<u>Column 8</u>
Line 27, change "comprises at the lateral structure" to --comprises a recess 3 at the lateral structure--
Line 47, change "tip seal 10a" to --tip seal 10b--

Signed and Sealed this
Fourteenth Day of June, 2016

Michelle K. Lee
*Director of the United States Patent and Trademark Office*